(12) United States Patent
Czarnecki et al.

(10) Patent No.: US 12,157,460 B2
(45) Date of Patent: Dec. 3, 2024

(54) OBJECT DETECTION SYSTEM AND METHOD FOR A WORK MACHINE USING WORK IMPLEMENT MASKING

(71) Applicant: Deere & Company, Moline, IL (US)

(72) Inventors: Nathaniel M. Czarnecki, Dubuque, IA (US); Giovanni A. Wuisan, Dubuque, IA (US); Rachel Bruflodt, Dubuque, IA (US); Christopher B. Howard, Dubuque, IA (US)

(73) Assignee: Deere & Company, Moline, IL (US)

( * ) Notice: Subject to any disclaimer, the term of this patent is extended or adjusted under 35 U.S.C. 154(b) by 424 days.

(21) Appl. No.: 17/515,415

(22) Filed: Oct. 30, 2021

(65) Prior Publication Data

US 2023/0133175 A1 May 4, 2023

(51) Int. Cl.
*B60W 30/00* (2006.01)
*B60R 1/06* (2006.01)
(Continued)

(52) U.S. Cl.
CPC .............. *B60W 30/08* (2013.01); *B60R 1/06* (2013.01); *B60W 50/14* (2013.01); *G06T 7/11* (2017.01);
(Continued)

(58) Field of Classification Search
CPC ............... B60W 30/08; B60W 50/14; B60W 2420/403; B60W 2050/143;
(Continued)

(56) References Cited

U.S. PATENT DOCUMENTS 9,233,710 B2   1/2016  Lavoie et al.
9,493,187 B2  11/2016  Pilutti et al.
(Continued)

FOREIGN PATENT DOCUMENTS

JP        6507501 B2 *  5/2019
WO   WO-2017122294 A1 *  7/2017  ............... B60R 1/00

OTHER PUBLICATIONS

Machine Translation of WO-2017122294-A1 (Year: 2017).*
(Continued)

*Primary Examiner* — Anne Marie Antonucci
*Assistant Examiner* — Jordan T Smith
(74) *Attorney, Agent, or Firm* — Gary L. Montle; Lucian Wayne Beavers; Patterson Intellectual Property Law, PC

(57) ABSTRACT

A system and method are provided for object detection for a work machine. In an embodiment, data may be received from at least one sensor associated with the work machine and corresponding to a field of view extending from the main frame. Objects are classified in respective locations in the field of view, and at least one segmentation mask is generated corresponding to contours for at least one portion of, or attachment to, the work machine as determined to be in the field of view, wherein each of the at least one segmentation mask defines a respective masked zone in the field of view. One or more of the classified objects may then be determined as separate from the portion/attachment, wherein the at least one segmentation mask is applied to the portion/attachment independently of the one or more separate objects in the field of view. The at least one segmentation mask may be dynamic in nature to account for detected movements of, e.g., attachments to the work machine.

16 Claims, 12 Drawing Sheets

(51) Int. Cl.
*B60W 30/08* (2012.01)
*B60W 50/14* (2020.01)
*G06T 7/11* (2017.01)
*G06T 7/149* (2017.01)
*G08G 1/16* (2006.01)

(52) U.S. Cl.
CPC .............. *G06T 7/149* (2017.01); *G08G 1/16* (2013.01); *B60R 2300/307* (2013.01); *B60R 2300/8093* (2013.01); *B60W 2420/403* (2013.01)

(58) Field of Classification Search
CPC ....... B60W 2050/146; B60W 2300/17; B60W 30/0956; B60R 1/06; B60R 2300/307; B60R 2300/8093; G06T 7/11; G06T 7/149; G08G 1/16; G08G 1/167; G06V 10/273; G06V 20/58
See application file for complete search history.

(56) References Cited

U.S. PATENT DOCUMENTS

| | | | |
|---|---|---|---|
| 9,598,036 | B2 | 3/2017 | Lim et al. |
| 10,214,239 | B2 | 2/2019 | Lee et al. |
| 10,344,450 | B2 | 7/2019 | Sharp et al. |
| 10,583,832 | B2 | 3/2020 | Foster et al. |
| 10,829,911 | B2 | 11/2020 | Kennedy et al. |
| 2014/0354813 | A1 | 12/2014 | Ishimoto |
| 2019/0100139 | A1 | 4/2019 | Koravadi |
| 2019/0253641 | A1* | 8/2019 | Matsuda ................ E02F 9/262 |
| 2019/0347498 | A1* | 11/2019 | Herman ................ G08G 1/162 |
| 2020/0238921 | A1* | 7/2020 | Matsuba ................ H04N 7/181 |
| 2021/0221363 | A1* | 7/2021 | Lai ........................ G08G 1/165 |
| 2022/0076033 | A1* | 3/2022 | Petrany ................. E02F 9/261 |
| 2022/0170242 | A1* | 6/2022 | Maley .................... G06T 7/70 |

OTHER PUBLICATIONS

Machine Translation of JP2016013887A (Year: 2016).*
Almeida, A., Vicente, P., & Bernardino, A. (Feb. 9, 2021). Where is my hand? Deep hand segmentation for visual self-recognition in humanoid robots. arXiv.org. https://arxiv.org/abs/2102.04750 (Year: 2021).*

* cited by examiner

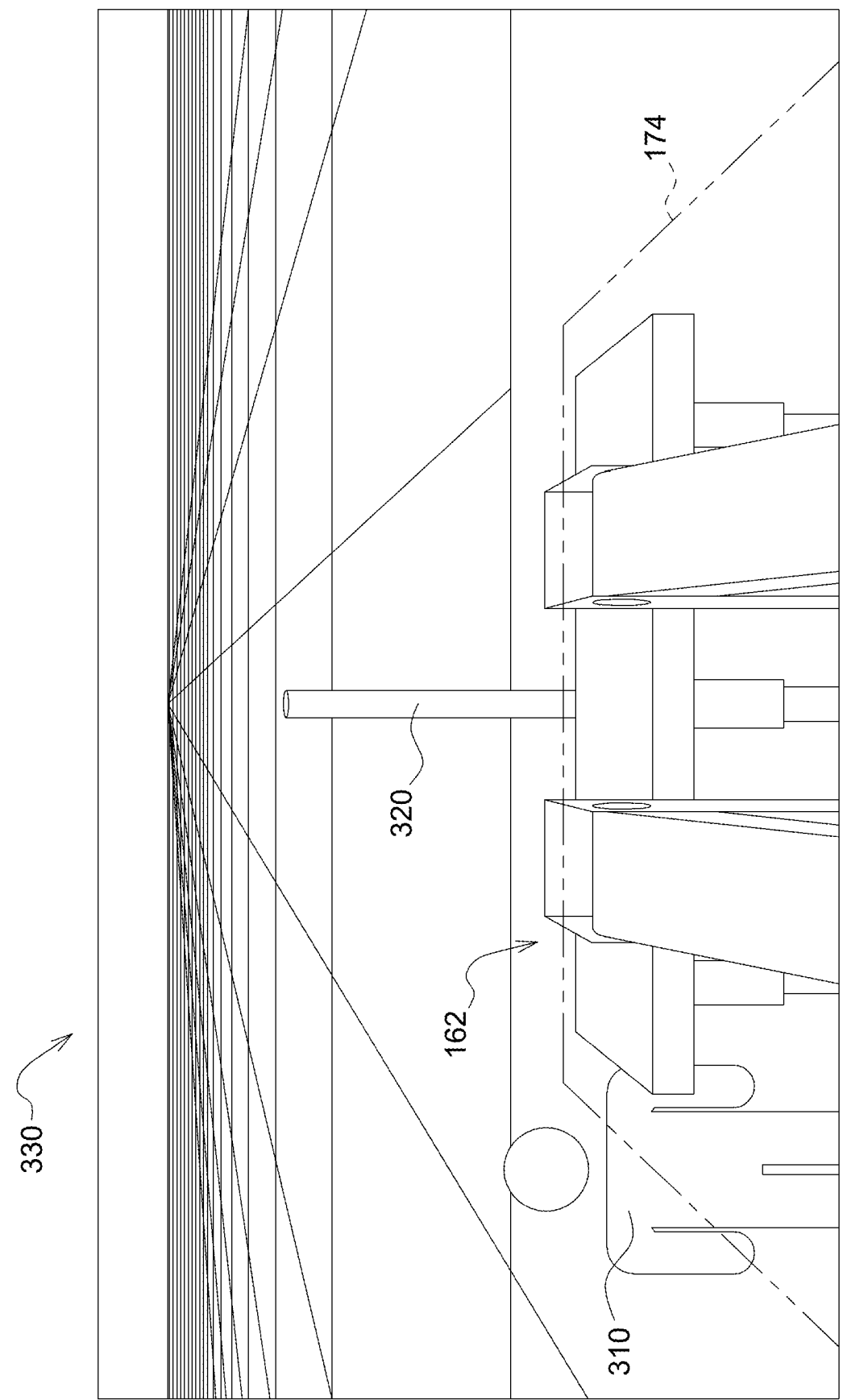

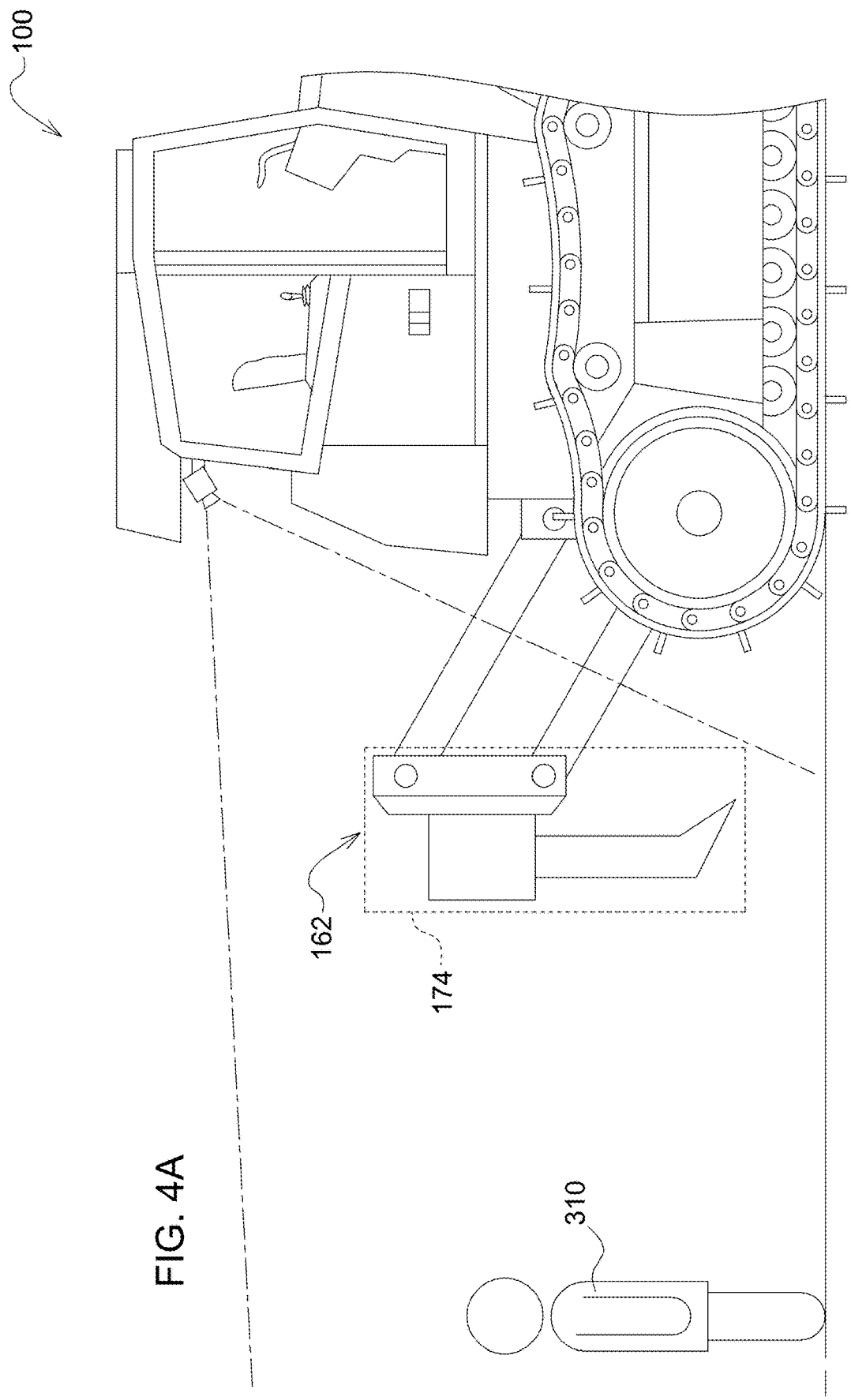

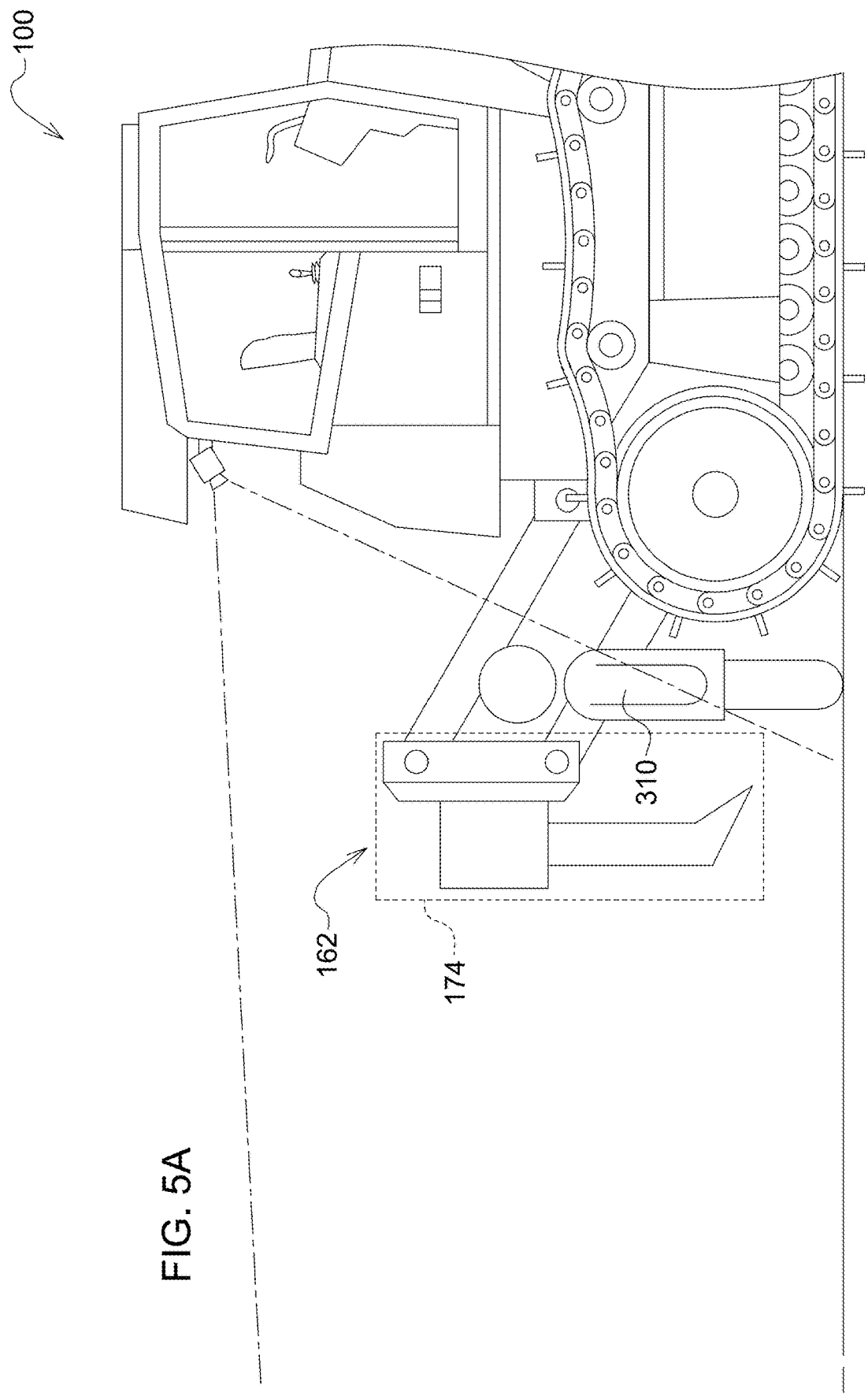

OBJECT DETECTION SYSTEM AND METHOD FOR A WORK MACHINE USING WORK IMPLEMENT MASKING

FIELD OF THE DISCLOSURE

The present disclosure relates generally to work machines which include work implements mounted thereon, and to methods of detecting and classifying objects in a proximity thereof. More particularly, the present disclosure relates to object detection methods using image masking with respect to work implements mounted to a work machine in order to separate and favorably distinguish external objects in a field of view.

BACKGROUND

Conventional methods are known for detecting objects in the rear of a work machine or equivalent vehicle, but typically are only functional when there are no vehicle components protruding into the field of view for associated sensors. As but one example, an automotive rear parking sensor becomes non-functional when there is a bike rack or trailer attached to the hitch, therefore prompting the driver to turn off the system as it cannot differentiate the vehicle attachments from obstacles behind the vehicle.

Work machines as the primary subject of the present disclosure may for example include self-propelled vehicles such as dozers, compact track loaders, excavator machines, skid steer loaders, and the like which grade or otherwise modify the terrain or equivalent working environment in some way. However, the scope of the present disclosure further extends to work machines that are not self-propelled. Such work machines may include one or more work implements mounted to a main frame thereof, or otherwise extending from the main frame into an external reference area which may cause a dangerous condition for objects within a certain proximity of the work machine. When such work implements are rear-mounted, such as for example a ripper, tamping roller, or the like, conventional object detection systems would be subject to the same inability to differentiate external objects as discussed above for motor vehicle sensors.

BRIEF SUMMARY

The current disclosure provides an enhancement to conventional systems, at least in part by introducing a novel object detection system and method for identifying and differentiating objects proximate to rear-mounted work implements, without "false positive" detection of the work implements themselves. Such a system may desirably assist operators in maintaining situational awareness around the work implement, even throughout movement of the work machine and/or of the work implements relative to the main frame of the work machine.

A system as disclosed herein may utilize machine learning techniques to identify the geometry of a work implement and selectively apply an appropriate masking feature, wherein the work implement may be automatically tracked and dynamically masked for enhanced object detection. The system and method may also, or in the alternative, determine which work implements are connected to the machine by comparing a detected shape thereof to a library of implement shapes, wherein an appropriate mask may be dynamically selected. Work implements may include machine-readable components such as for example AprilTag tokens or the like to facilitate the tracking of implement orientation and accordingly dynamic movements of the applied mask.

In one particular embodiment, an object detection method is accordingly disclosed herein for a work machine comprising one or more work implements supported from a main frame. The method includes receiving, from at least one sensor (e.g., an image data source) associated with the work machine, data (e.g., image data) corresponding to a field of view extending from the main frame. The method further includes classifying objects in respective locations in the field of view, and generating at least one segmentation mask corresponding to contours for at least one portion of, or attachment to, the work machine as determined to be in the field of view, wherein each of the at least one segmentation mask defines a respective masked zone in the field of view. One or more of the classified objects may be determined to be separate from the at least one portion of, or attachment to, the work machine, wherein the at least one segmentation mask is applied to the at least one portion of, or attachment to, the work machine independently of any of the one or more separate objects in the field of view.

In one exemplary aspect according to the above-referenced embodiment, the method may further include generating images on a display unit corresponding to the field of view and having the at least one image segmentation mask applied thereto.

In another exemplary aspect according to the above-referenced embodiment, the method may further include, during movement of the work machine, detecting from the received data at least one static portion in the field of view and one or more dynamic portions relative thereto in the field of view, and generating the at least one segmentation mask corresponding to the detected at least one static portion in the field of view.

In another exemplary aspect according to the above-referenced embodiment, data corresponding to at least one portion of, and/or attachment to, the work machine may be retrieved and applied for generation of an associated segmentation mask based on user input.

In another exemplary aspect according to the above-referenced embodiment, the user input comprises a user selection from among a library of selectable portions of and/or attachments to the work machine.

In another exemplary aspect according to the above-referenced embodiment, the method further includes dynamically generating the at least one segmentation mask based on determined movements of an attachment to the work machine relative to the field of view.

In another exemplary aspect according to the above-referenced embodiment, the movements of the attachment may be determined based on detected steering signals for the work machine.

In another exemplary aspect according to the above-referenced embodiment, the movements of the attachment are determined based on first input signals from a sensor associated with the attachment and second input signals from a sensor associated with the work machine.

In another exemplary aspect according to the above-referenced embodiment, a bounding region for the at least one portion of, or attachment to, the work machine may be determined via image classification from the received data.

In another exemplary aspect according to the above-referenced embodiment, a bounding region for the at least one portion of, or attachment to, the work machine may be determined at least in part via output signals from one or more movement sensors associated with the respective portion of, or attachment to, the work machine.

In another exemplary aspect according to the above-referenced embodiment, a bounding region for the at least one portion of, or attachment to, the work machine may be determined by scanning a machine readable tag associated with the respective at least one portion of, or attachment to, the work machine and retrieving bounding region data corresponding to the respective at least one portion of, or attachment to, the work machine from data storage based on the scanned machine readable tag.

In another exemplary aspect according to the above-referenced embodiment, the method may further include detecting respective positions of the one or more further objects determined to be in the respective field of view, relative to the work machine and/or the at least one portion of, or attachment to, the work machine, and conditionally generating output signals corresponding to at least an identified unsafe position of an object relative to at least one of the work machine and/or the at least one portion of, or attachment to, the work machine.

In another embodiment, a work machine as disclosed herein may comprise a main frame supported by one or more ground engaging units, one or more work implements supported from the main frame, and at least one sensor (e.g., at least one image data source) configured to generate data (e.g., image data) corresponding to a field of view extending from the main frame. A controller is linked to receive the data from the at least one sensor, and configured to direct the performance of a method according to the above-referenced embodiment and optionally any one or more of the associated aspects.

In another embodiment, a non-transitory computer readable medium as disclosed herein may have a computer program residing thereon and executable by a processor to direct the performance of a method according to the above-referenced embodiment and optionally any one or more of the associated aspects.

Numerous objects, features and advantages of the embodiments set forth herein will be readily apparent to those skilled in the art upon reading of the following disclosure when taken in conjunction with the accompanying drawings.

BRIEF DESCRIPTION OF THE DRAWINGS

FIGS. 3A-3C are perspective views representing an exemplary rear-view camera image, an initial classification of objects in the camera image, and an object separation with an image segmentation mask applied to a portion of the camera image, respectively.

FIG. 4A is a side view representing an exemplary work machine and field of view for a camera mounted to a rear portion thereof, including a human standing behind a rear-mounted work implement.

FIG. 5A is a side view representing an exemplary tracked work machine and field of view for a camera mounted to a rear portion thereof, including a human between a rear-mounted work implement and the machine tracks.

FIG. 5B is a perspective view from the work machine of FIG. 5A, representing the human separable by the system from the rear-mounted work implement in the field of view.

DETAILED DESCRIPTION

Figure 1:
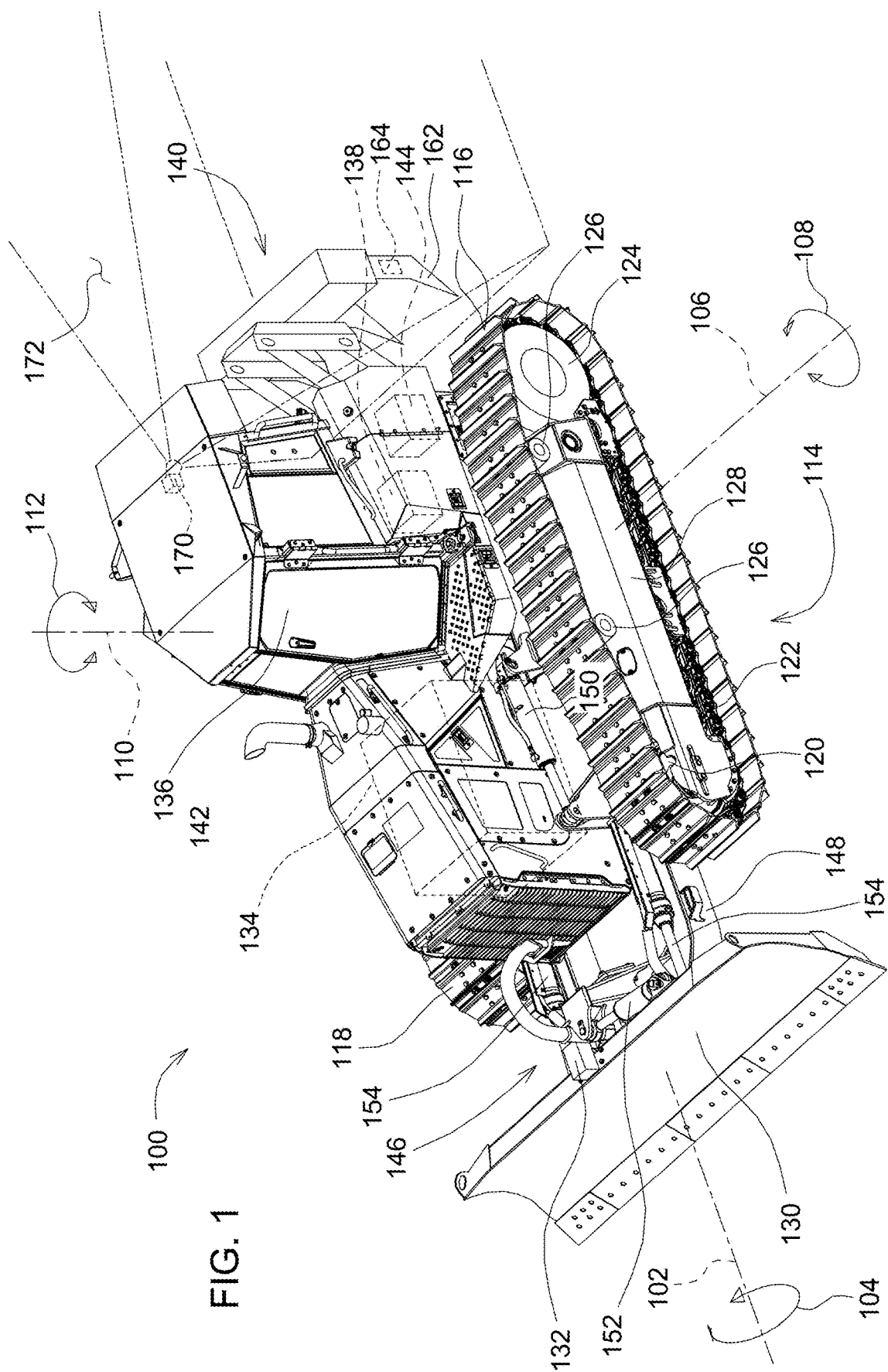
FIG. 1 is a perspective view of a tracked work machine incorporating an embodiment of a work machine and method as disclosed herein.

FIG. 1 is a perspective view of a work machine 100. In the illustrated embodiment, the work machine 100 is a crawler dozer having a front-mounted work implement 130 (e.g., ground-engaging blade) and a rear-mounted work implement 162 (e.g., ripper), but may include any of various alternative implement configurations (e.g., rear only) or work machines 100 such as a compact track loader, motor grader, scraper, skid steer, backhoe, and tractor, to name but a few examples. While operating, the work machine may experience movement in three directions and rotation in three directions. A direction for the work machine may also be referred to with regard to a longitudinal direction 102, a latitudinal or lateral direction 106, and a vertical direction 110. Rotation for work machine 100 may be referred to as roll 104 or the roll direction, pitch 108 or the pitch direction, and yaw 112 or the yaw direction or heading.

An operator's cab 136 may be located on the main frame 140. The operator's cab and a front-mounted working implement 130 may both be mounted on the main frame 140 so that at least in certain embodiments the operator's cab faces in the working direction of the working implement 130. A control station including a user interface 142 with a display unit may be located in the operator's cab 136. As used herein, directions with regard to work machine 100 may be referred to from the perspective of an operator seated within the operator cab 136: the left of work machine is to the left of such an operator, the right of work machine is to the right of such an operator, the front or fore of work machine 100 is the direction such an operator faces, the rear or aft of work machine is behind such an operator, the top of work machine is above such an operator, and the bottom of work machine is below such an operator.

The term "user interface" 142 as used herein may broadly take the form of a display unit and/or other outputs from the system such as indicator lights, audible alerts, and the like. The user interface may further or alternatively include various controls or user inputs (e.g., a steering wheel, joysticks, levers, buttons) for operating the work machine 100, including operation of the engine, hydraulic cylinders, and the like. Such an onboard user interface may be coupled to a vehicle control system via for example a CAN bus arrangement or other equivalent forms of electrical and/or electro-mechanical signal transmission. Another form of user interface (not shown) may take the form of a display unit (not shown) that is generated on a remote (i.e., not onboard) computing device, which may display outputs such as status indications and/or otherwise enable user interaction such as the providing of inputs to the system. In the context of a remote user interface, data transmission between for example the vehicle control system and the user interface may take the form of a wireless communications system and associated components as are conventionally known in the art.

The illustrated work machine 100 further includes a control system including a controller 138 (further described below with respect to FIG. 3). The controller 138 may be part of the machine control system of the work machine, or it may be a separate control module. Accordingly, the controller 138 may generate control signals for controlling the operation of various actuators throughout the work machine 100, which may for example be hydraulic motors, hydraulic piston-cylinder units, electric actuators, or the like. Electronic control signals from the controller may for example be received by electro-hydraulic control valves associated with respective actuators, wherein the electro-hydraulic control valves control the flow of hydraulic fluid to and from the respective hydraulic actuators to control the actuation thereof in response to the control signal from the controller.

The controller 138 may include or be functionally linked to the user interface 142 and optionally be mounted in the operators cab 136 at a control panel.

The controller 138 is configured to receive input signals from some or all of various sensors associated with the work machine 100, which may include for example one or more sensors 132 associated with a front-mounted work implement 130, a set of one or more sensors 144 affixed to the main frame 140 of the work machine 100 and configured to provide signals indicative of, e.g., an inclination (slope) of the main frame or the blade, and a set of one or more sensors 164 affixed to for example a rear-mounted work implement 162 and configured to provide signals indicative of a relative position thereof. In alternative embodiments, such sensors 132, 144, 164 may not be affixed directly to the referenced components but may instead be connected indirectly through intermediate components or structures, such as rubberized mounts. For example, sensor 144 may not be directly affixed to the main frame 140 but still connected to the frame at a fixed relative position so as to experience the same motion as the main frame.

The sensor(s) 144 may be configured to provide at least a signal indicative of the inclination of the main frame 140 relative to the direction of gravity, or to provide a signal or signals indicative of other positions or velocities of the frame, including its angular position, velocity, or acceleration in a direction such as the direction of roll 104, pitch 108, yaw 112, or its linear acceleration in a longitudinal 102, latitudinal 106, and/or vertical 110 direction. Sensors may be configured to directly measure inclination, or for example to measure angular velocity and integrate to arrive at inclination, and may typically, e.g., be comprised of an inertial measurement unit (IMU) mounted on the main frame 140 and configured to provide for example a work machine inclination (slope) signal, or equivalent signals corresponding to the slope of the frame 140, as inputs to the controller 138. Such an IMU 144 may for example be in the form of a three-axis gyroscopic unit configured to detect changes in orientation of the sensor, and thus of the frame 140 to which it is fixed, relative to an initial orientation.

In other embodiments, the sensors may include a plurality of GPS sensing units fixed relative to the main frame 140 or work implement 130, 162, which can detect the absolute position and orientation of the work machine 100 or components thereof within an external reference system, and can detect changes in such position and orientation.

An image data source 170 such as for example a stereo camera 170 may be coupled to the work machine 100, for example at an elevated rear portion of the main frame 140 and arranged to provide a field of view 172 encompassing at least a rear-mounted work implement 162 and objects proximate thereto. The image data source 170 is functionally linked to the controller 138 as further described herein for image processing features and steps.

The controller 138 in an embodiment (not shown) may include or may be associated with a processor, a computer readable medium, a communication unit, data storage 178 such as for example a database network, and the aforementioned user interface 142 or control panel having a display. An input/output device, such as a keyboard, joystick or other user interface tool, may be provided so that the human operator may input instructions to the controller 138. It is understood that the controller described herein may be a single controller having all of the described functionality, or it may include multiple controllers wherein the described functionality is distributed among the multiple controllers.

Various operations, steps or algorithms as described in connection with the controller 138 can be embodied directly in hardware, in a computer program product such as a software module executed by a processor, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit may support or provide communications between the controller 138 and external systems or devices, and/or support or provide communication interface with respect to internal components of the work machine 100. The communications unit may include wireless communication system components (e.g., via cellular modem, WiFi, Bluetooth or the like) and/or may include one or more wired communications terminals such as universal serial bus ports.

Data storage 178 as discussed herein may, unless otherwise stated, generally encompass hardware such as volatile or non-volatile storage devices, drives, memory, or other storage media, as well as one or more databases residing thereon.

The work machine 100 is supported on the ground by an undercarriage 114. The undercarriage 114 includes ground engaging units 116, 118, which in the present example are formed by a left track 116 and a right track 118, and provide tractive force for the work machine 100. Each track may be comprised of shoes with grousers that sink into the ground to increase traction, and interconnecting components that allow the tracks to rotate about front idlers 120, track rollers 122, rear sprockets 124 and top idlers 126. Such interconnecting components may include links, pins, bushings, and guides, to name a few components. Front idlers 120, track rollers 122, and rear sprockets 124, on both the left and right sides of the work machine 100, provide support for the work machine 100 on the ground. Front idlers 120, track rollers 122, rear sprockets 124, and top idlers 126 are all pivotally connected to the remainder of the work machine 100 and rotationally coupled to their respective tracks so as to rotate with those tracks. The track frame 128 provides structural support or strength to these components and the remainder of the undercarriage 114. In alternative embodiments, the ground engaging units 116, 118 may comprise, e.g., wheels on the left and right sides of the work machine.

Front idlers 120 are positioned at the longitudinal front of the left track 116 and the right track 118 and provide a rotating surface for the tracks to rotate about and a support point to transfer force between the work machine 100 and the ground. The left and right tracks 116, 118 rotate about the front idlers 120 as they transition between their vertically lower and vertically upper portions parallel to the ground, so approximately half of the outer diameter of each of the front idlers 120 is engaged with the respective left 116 or right track 118. This engagement may be through a sprocket and pin arrangement, where pins included in the left 116 and right tracks 118 are engaged by recesses in the front idler 120 so as to transfer force. This engagement also results in the vertical height of the left and right tracks 116, 118 being only slightly larger than the outer diameter of each of the front idlers 120 at the longitudinal front of the tracks. Forward engaging points 130 of the tracks 116, 118 can be approximated as the point on each track vertically below the center of the front idlers 120, which is the forward point of the tracks which engages the ground.

Track rollers 122 are longitudinally positioned between the front idler 120 and the rear sprocket 124 along the bottom left and bottom right sides of the work machine 100. Each of the track rollers 122 may be rotationally coupled to the left track 116 or the right track 118 through engagement between an upper surface of the tracks and a lower surface of the track rollers 122. This configuration may allow the track rollers 122 to provide support to the work machine 100, and in particular may allow for the transfer of forces in the vertical direction between the work machine and the ground. This configuration also resists the upward deflection of the left and right tracks 116, 118 as they traverse an upward ground feature whose longitudinal length is less than the distance between the front idler 120 and the rear sprocket 124.

Rear sprockets 124 may be positioned at the longitudinal rear of each of the left track 116 and the right track 118 and, similar to the front idlers 120, provide a rotating surface for the tracks to rotate about and a support point to transfer force between the work machine 100 and the ground. The left and right tracks 116, 118 rotate about the rear sprockets as they transition between their vertically lower and vertically upper portions parallel to the ground, so approximately half of the outer diameter of each of the rear sprockets 124 is engaged with the respective left or right track 116, 118. This engagement may be through a sprocket and pin arrangement, where pins included in the left and right tracks are engaged by recesses in the rear sprockets 124 to transfer force. This engagement also results in the vertical heights of the tracks being only slightly larger than the outer diameter of each of the rear sprockets 124 at the longitudinal back or rear of the respective track. The rearmost engaging point of the tracks can be approximated as the point on each track vertically below the center of the rear sprockets, which is the rearmost point of the track which engages the ground. In this embodiment, each of the rear sprockets 124 may be powered by a rotationally coupled hydraulic motor so as to drive the left track 116 and the right track 118 and thereby control propulsion and traction for the work machine 100. Each of the left and right hydraulic motors may receive pressurized hydraulic fluid from a hydrostatic pump whose direction of flow and displacement controls the direction of rotation and speed of rotation for the left and right hydraulic motors. Each hydrostatic pump may be driven by an engine 134 (or equivalent power source) of the work machine and may be controlled by an operator in the operator cab 136 issuing commands which may be received by the controller 138 and communicated to the left and right hydrostatic pumps. In alternative embodiments, each of the rear sprockets may be driven by a rotationally coupled electric motor or a mechanical system transmitting power from the engine.

Top idlers 126 are longitudinally positioned between the front idlers 120 and the rear sprockets 124 along the left and right sides of the work machine 100 above the track rollers 122. Similar to the track rollers, each of the top idlers may be rotationally coupled to the left track 116 or the right track 118 through engagement between a lower surface of the tracks and an upper surface of the top idlers. This configuration may allow the top idlers to support the tracks for the longitudinal span between the front idler and the rear sprocket and prevent downward deflection of the upper portion of the tracks parallel to the ground between the front idler and the rear sprocket.

The blade assembly 130 as represented in the embodiment of FIG. 1 is a front-mounted work implement 130 which may engage the ground or material, for example to move material from one location to another and to create features on the ground, including flat areas, grades, hills, roads, or more complexly shaped features. The blade 130 is movably connected to the main frame 140 of the work machine 100 through a linkage 146 which supports and actuates the blade and is configured to allow the blade to be lifted (i.e., raised or lowered in the vertical direction 110) relative to the main frame. The linkage 146 includes a c-frame 148, a structural member with a C-shape positioned rearward of the blade 130, with the C-shape open toward the rear of the work machine 100. The blade 130 may be lifted (i.e., raised or lowered) relative to the work machine 100 by the actuation of lift cylinders 150, which may raise and lower the c-frame 148. The blade 130 may be tilted relative to the work machine 100 by the actuation of a tilt cylinder 152, which may also be referred to as moving the blade in the direction of roll 104. The blade 130 may be angled relative to the work machine 100 by the actuation of angle cylinders 154, which may also be referred to as moving the blade in the direction of yaw 112. Each of the lift cylinders 150, tilt cylinder 152, and angle cylinders 154 may for example be a double acting hydraulic cylinder.

The ripper assembly 162 as represented in the embodiment of FIG. 1 is a rear-mounted work implement 162 which also may selectively engage the ground or material, for example to loosen the ground behind the work machine 100. The ripper assembly 162 as shown includes a plurality of (e.g., three) separate ripper shanks which are typically substantially perpendicular to the ground. When the ripper is not in use, the shanks may be raised so that they are not in contact with the ground. Alternatively, when the ripper is in use, the shanks may be lowered to penetrate the ground surface and thereby loosen the ground as the work machine proceeds.

Figure 2:
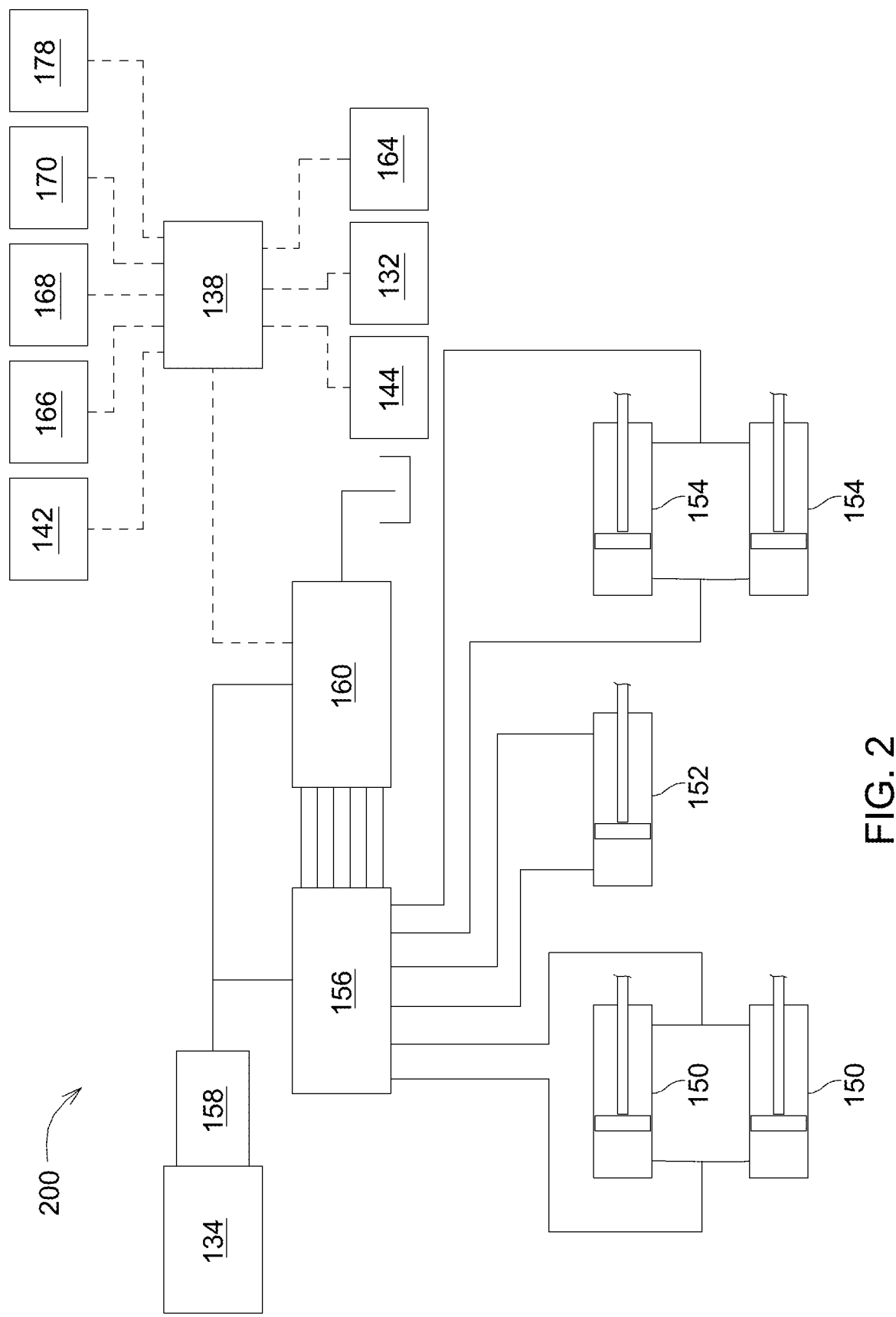
FIG. 2 is a block diagram representing an exemplary control system for the work machine according to an embodiment as disclosed herein.

As schematically illustrated in FIG. 2, the work machine 100 in an embodiment as disclosed herein includes a control system 200 including a controller 138. The controller 138 may be part of the machine control system of the work machine 100, or it may be a separate control module. The control system 200 may include hydraulic and electrical components for controlling respective positions of the front-mounted 130 and/or rear-mounted 162 work implements. For example with respect to the blade 130, each of the lift cylinders 150, the tilt cylinder 152, and the angle cylinders 154 is hydraulically connected to a hydraulic control valve 156, which receives pressurized hydraulic fluid from a hydraulic pump 158, which may be rotationally connected to the engine 134, and directs such fluid to the lift cylinders, the tilt cylinder, the angle cylinders, and other hydraulic circuits or functions of the work machine. The hydraulic control valve may meter such fluid out, or control the flow rate of hydraulic fluid to each hydraulic circuit to which it is connected. In alternative embodiments, the hydraulic control valve may not meter such fluid out but may instead only selectively provide flow paths to these functions while metering is performed by another component (e.g., a variable displacement hydraulic pump) or not performed at all. The hydraulic control valve may meter such fluid out through a plurality of spools, whose positions control the flow of hydraulic fluid, and other hydraulic logic. The spools may be actuated by solenoids, pilots (e.g., pressurized hydraulic fluid acting on the spool), the pressure upstream or downstream of the spool, or some combination of these and other elements.

In various embodiments, the controller 138 may send commands to actuate work implements 130, 162 in a number of different manners. As one example, the controller 138 may be in communication with a valve controller via a controlled area network (CAN) and may send command signals to the valve controller in the form of CAN messages. The valve controller may receive these messages from the controller and send current to specific solenoids within the electrohydraulic pilot valve 160 based on those messages. As another example, the controller may actuate a work implement 130, 162 by actuating an input in the operator cab 136. For example, an operator may use a joystick to issue commands to actuate the blade 130, and the joystick may generate hydraulic pressure signals, pilots, which are communicated to the hydraulic control valve 156 to cause the actuation of the blade. In such a configuration, the controller may be in communication with electrical devices (e.g., solenoids, motors) which may actuate a joystick in the operator cab. In this way, the controller may actuate the blade by actuating these electrical devices instead of communicating signals to electrohydraulic pilot valve.

As referenced above, the controller 138 is configured to receive input signals from some or all of various sensors 170 which may include image data sources such as cameras and collectively defining an imaging system. The sensors 170 may include video cameras configured to record an original image stream and transmit corresponding data to the controller 138. In the alternative or in addition, the sensors 170 may include one or more of an infrared camera, a stereoscopic camera, a PMD camera, high resolution light detection and ranging (LiDAR) scanners, radar detectors, laser scanners, and the like within the scope of the present disclosure. The number and orientation of said sensors 170 may vary in accordance with the type of work machine 100 and relevant applications, but may at least be provided with respect to a field of view 172 rearward of the work machine 100 and configured to capture image data associated with surroundings including for example the rear-mounted work implement 162 and other objects proximate thereto.

The position and size of an image region recorded by a respective camera as a sensor 170 may depend on the arrangement and orientation of the camera and the camera lens system, in particular the focal length of the lens of the camera. One of skill in the art may further appreciate that image data processing functions may be performed discretely at a given image data source if properly configured, but also or otherwise may generally include at least some image data processing by the controller or other downstream data processor. For example, image data from any one or more image data sources may be provided for three-dimensional point cloud generation, image segmentation, object delineation and classification, and the like, using image data processing tools as are known in the art in combination with the objectives disclosed.

The controller 138 of the work machine 100 may be configured to produce outputs, as further described below, to a user interface 142 associated with a display unit for display to the human operator. The controller 138 may be configured to receive inputs from the user interface 142, such as user input provided via the user interface 142. Not specifically represented in FIG. 2, the controller 138 of the work machine 100 may in some embodiments further receive inputs from and generate outputs to remote devices associated with a user via a respective user interface, for example a display unit with touchscreen interface. Data transmission between for example the vehicle control system and a remote user interface may take the form of a wireless communications system and associated components as are conventionally known in the art. In certain embodiments, a remote user interface and vehicle control systems for respective work machines may be further coordinated or otherwise interact with a remote server or other computing device for the performance of operations in a system as disclosed herein.

The controller 138 may in various embodiments, as part of the control system of FIG. 2 and further in line with the above-referenced disclosure, be functionally linked to a reading device 166 as conventionally known in the art such as for example an RFID device, barcode scanner, or the like for obtaining readable information. The reading device 166 may be a discrete device, or in other embodiments may include a data processing module in combination with image data or equivalent data captured by the sensor 170. For example, a work implement 130, 162 within a field of view 172 of a camera as the sensor 170 may have a barcode or equivalent tags (e.g., AprilTags) 166 associated with machine readable information, which may as further described herein be used to identify and/or retrieve information associated with the work implement.

In an embodiment as shown, the controller 138 may further be functionally linked to a work machine movement control system 168, wherein for example the controller may directly or indirectly generate output signals for controlling the steering and/or advance speed of the work machine 100. The controller 138 may alternatively or in addition receive input signals from the movement control system 168 indicative of the steering and/or advance speed of the work machine 100.

An embodiment of a method 400 of the present disclosure may now be described with further illustrative reference to FIGS. 3-7. The present embodiment is intended as illustrative and the associated description is not limiting on the scope of any other embodiments unless otherwise specifically noted herein. It should also be noted that various steps as disclosed in accordance with the present embodiment may be combined, omitted, or supplemented by one of skill in the art when considering the applicable functions and without necessarily altering the scope of the present disclosure, unless otherwise expressly provided herein.

The exemplary method 400 as illustrated begins in step 410 by capturing data (e.g., image data) in at least one field of view 172. As further described below, the relevant field of view is associated with a rear-mounted camera as a sensor 170 and comprises surroundings at least to the rear of the work machine 100.

In step 420, the system (via the controller 138 directly, or indirectly via one or more associated image processing components or modules) classifies objects in respective locations in the field of view 172, and further determines from the captured data whether a portion of the work machine 100 or an attachment thereto, such as for example rear-mounted work implement 162, is present in the field of view 172.

Such a determination may be accomplished in numerous ways within the scope of the present disclosure. For example, in step 430 as shown, the system obtains information regarding for example physical contours of the work implement 162 and generates a bounding region 174 about said contours. The bounding region 174 may be a relatively simple three-dimensional polyhedron as illustrated in the figures, or in other embodiments may include any number of sides, angles, curved faces, or the like as better or more precisely corresponding with the actual contours of the work implement 162. In certain embodiments wherein the perspective is substantially horizontal or substantially vertical in orientation (e.g., a bird's eye view) the bounding region 174 and the associated image segmentation mask 176 as further described below may be a relatively simple two-dimensional polygon, or may include any number of sides, angles, curved faces, or the like as better or more precisely corresponding with the actual contours of the work implement 162.

In various embodiments, the information regarding a presence and/or physical contours of the work implement 162 may be obtained in one or more of numerous forms. In one example as referenced above (step 412), machine readable tags such as for example AprilTags, RFID tags and the like may be provided on the work implement 162 itself, such that scanning of the tags enables simple retrieval of the associated information (e.g., a type of work implement or more specific information regarding the unique implement itself) by the controller 138. In another example (step 414), conventional image classification techniques may be utilized to recognize the presence and/or at least roughly determine contours of the work implement 162. For example, the system may be configured to ascertain a work implement 162 or type of work implement that is coupled to the work machine 100 by comparing a detected shape to a library of work implement shapes, wherein an appropriate image segmentation mask may be selected. In another example (step 416), movement and/or position sensors 164 associated with the work implement 162 may generate output signals to the controller 138 which, taken alone or further in combination with one or more other sensors 132, 144 may be indicative of a position of the rear-mounted implement 162 or a likelihood that the implement 162 is in the relevant field of view 172.

In step 440, the system applies at least one image segmentation mask 176 in association with the generated bounding region 174, and independently of any objects determined to be separate from portions of the work machine 100 or attachments (e.g., work implements 162) thereto and extending into the field of view 172. In step 442, the system generates a display on the display unit 142 in the operator cab, or in some embodiments a remote display unit, with a masked area corresponding to the image segmentation mask 176. Such a display may comprise images from the same rear-view perspective as an orientation of the associated sensor 170, or in various embodiments may comprise a top-down (e.g., bird's eye) view, surround view, or other views as may be for example generated by stitching together images from a plurality of sensors 170. Where a number of views are available, user selection from among such views may optionally be enabled via the user interface. In an embodiment, the masked area may not be simply obscured but rather augmentation may be utilized to generate an image corresponding to objects in an area behind the masked area, for example using additional cameras that are not obscured in the relevant area by the same work implement 162. In step 444, the system performs an object detection and/or recognition function utilizing the image segmentation mask 176, or otherwise stated an image segmentation mask may facilitate object separation such that objects other than the masked work implement 162 may be reliably detected and/or recognized by the system.

Figure 3B:
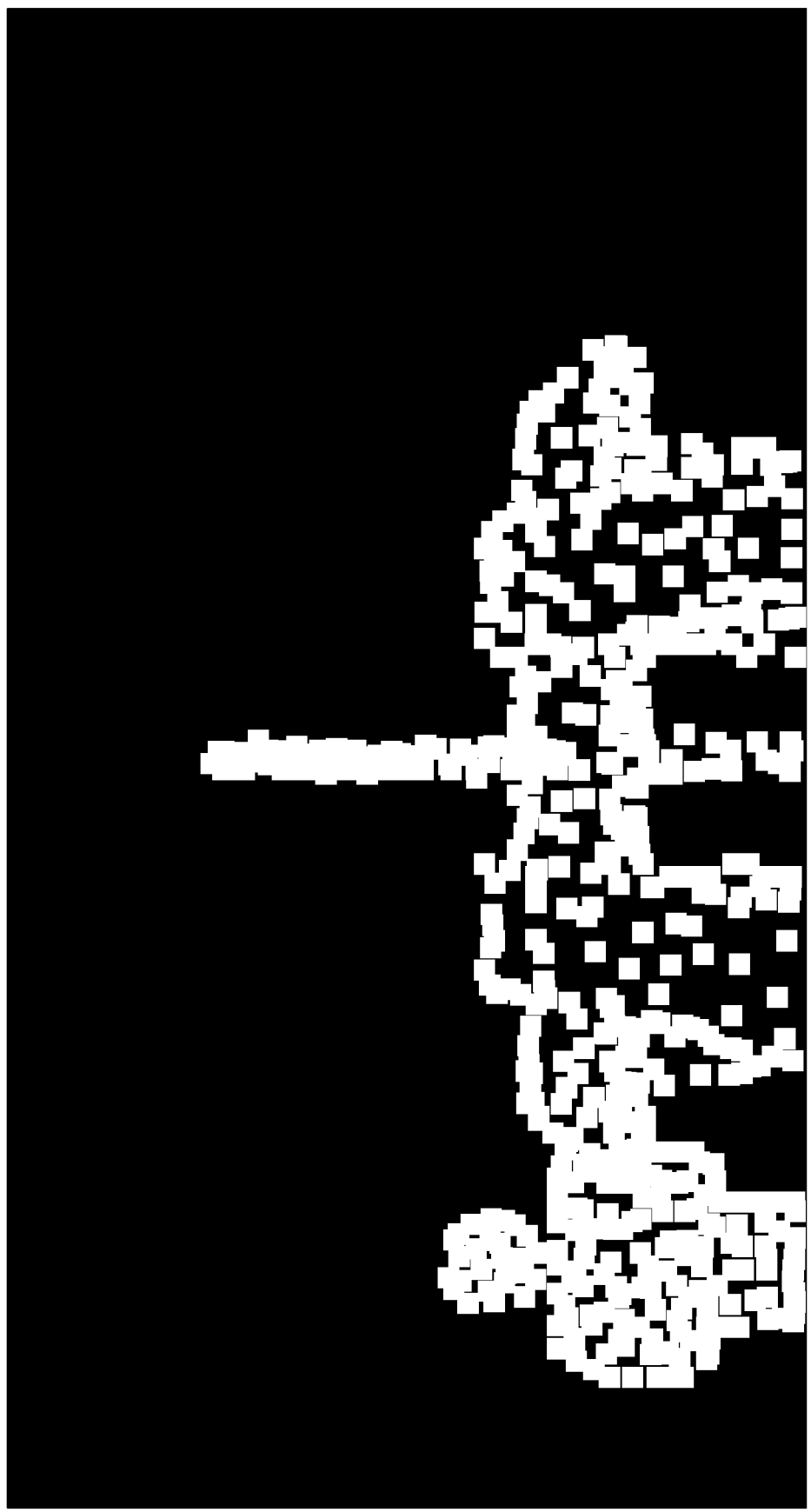
Figure 3C:

In one example, with reference to a camera view from the upper rear portion of a work machine 100 as shown in FIG. 3A, a first object 310 is alongside the rear-mounted work implement 162 and a second object 320 is behind the rear-mounted work implement 162. A digitized image classification may be unable to reliably distinguish the first object 310, second object 320, and work implement 162, as represented for example in FIG. 3B. A depth disparity view according to conventional image processing techniques may indicate that the second object 320 is not at the same depth as the work implement 162, but would typically be unable to distinguish the first object 310 and the work implement 162 as being at the same depth. With an appropriate bounding region 174 and an associated image segmentation mask 176 applied to the work implement 162, however, the work implement 162 may be ignored and the various objects 310, 320 reliably separated by the image processing system for the purpose of determining their respective identities, locations, movements, or the like.

In various embodiments, the form of the bounding region 174 and the associated image segmentation mask 176 may substantially correlate with the contours of the work implement 162 itself, for example where detailed information regarding said contours is available for retrieval upon identifying the particular work implement and/or current orientation thereof using machine readable tags or the like. In other embodiments, the form of the bounding region 174 and/or the image segmentation mask 176 may be more generalized. A more detailed bounding region 174 and image segmentation mask 176 may typically be preferred, as may be illustrated for example by reference to FIGS. 4A, 4B, 5A, and 5B.

Figure 4B:
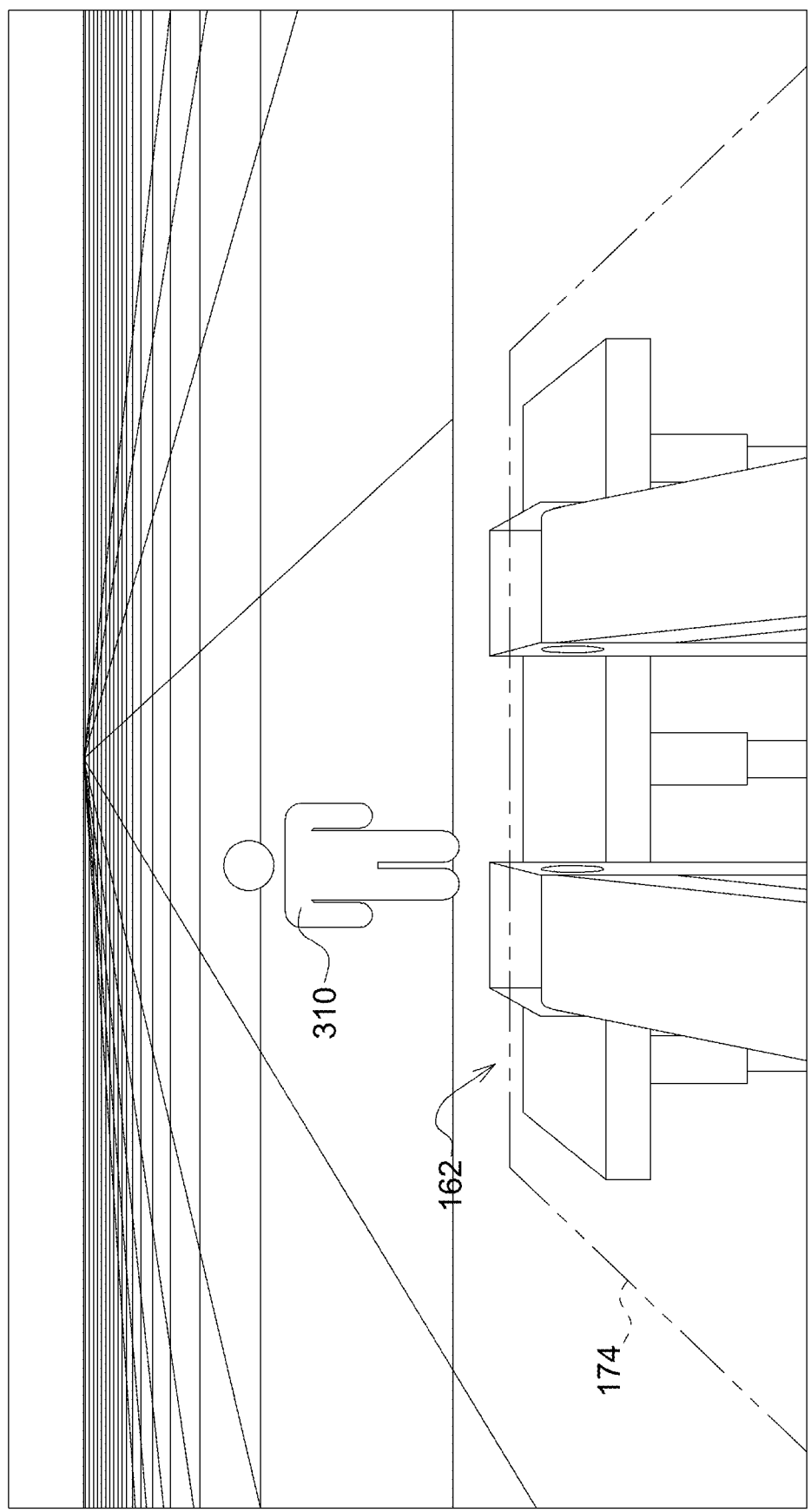
FIG. 4B is a perspective view from the work machine of FIG. 4A, representing the human separable by the system from the rear-mounted work implement in the field of view.
Figure 6A:
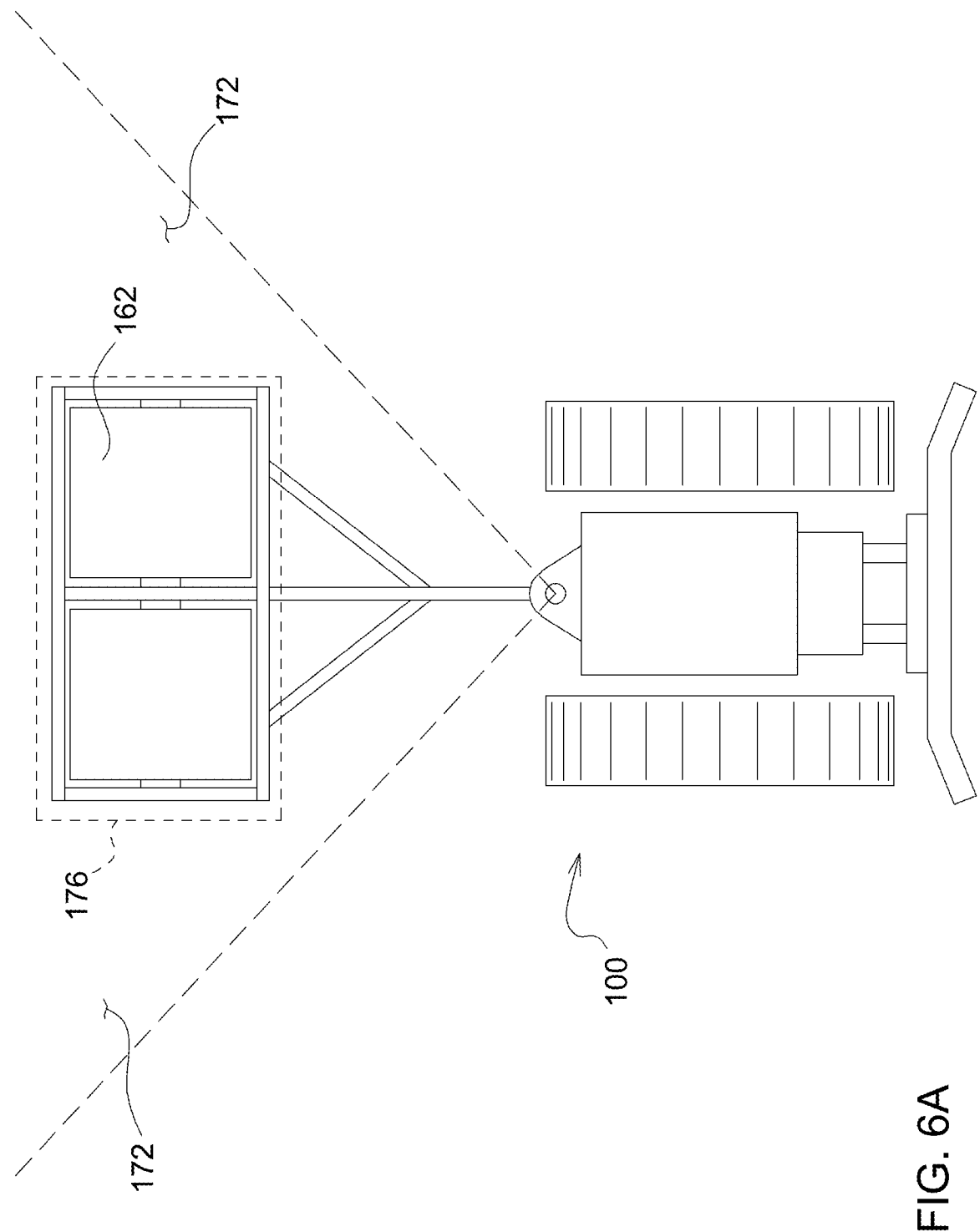
FIG. 6A is a top view representing an exemplary work machine and image segmentation mask applied within a field of view for a camera mounted to a rear portion thereof.
Figure 6B:
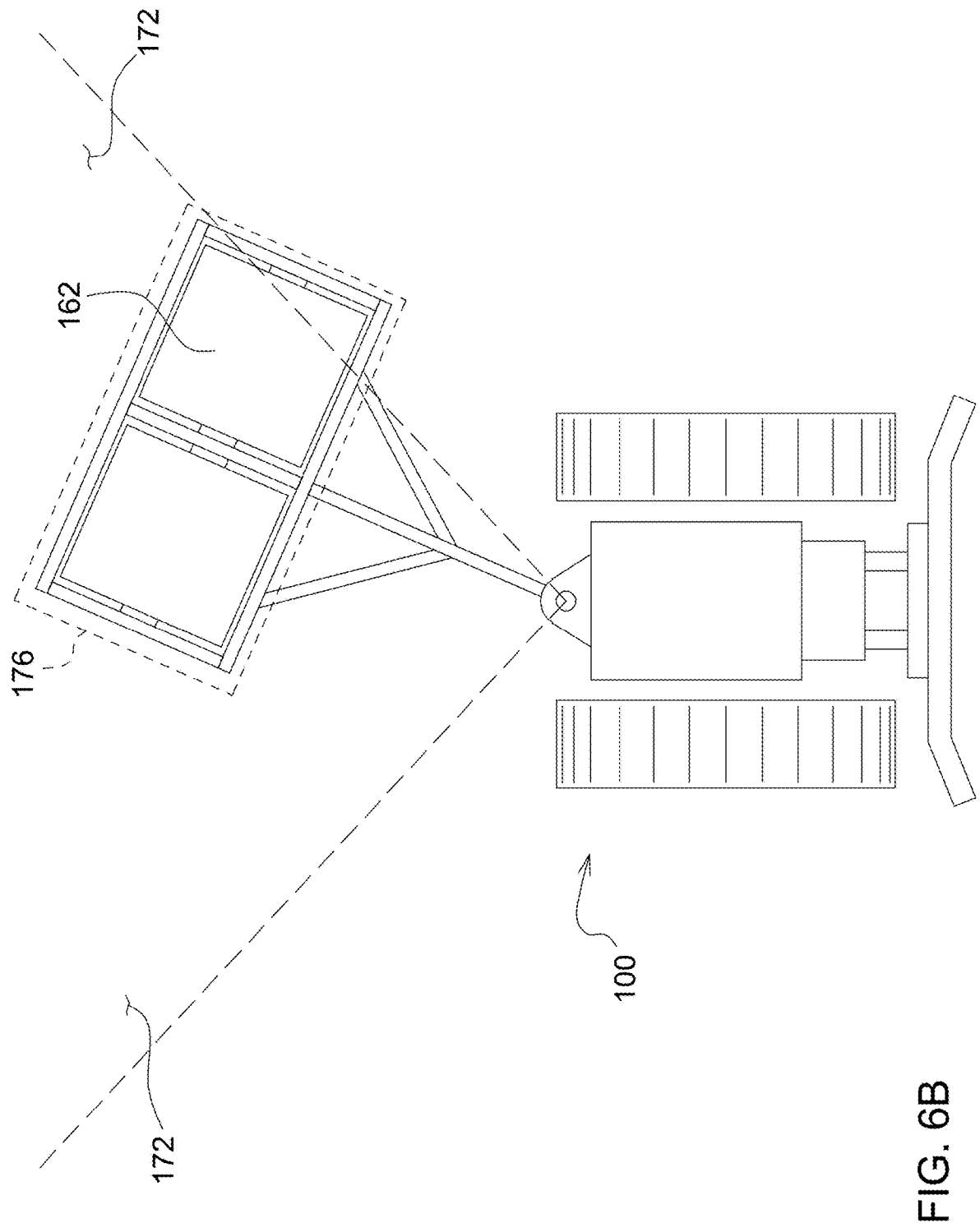
FIG. 6B is a top view representing the work machine of FIG. 6A, with the image segmentation mask being dynamically applied with respect to movement of the work implement relative to the main frame of the work machine.
Figure 7:
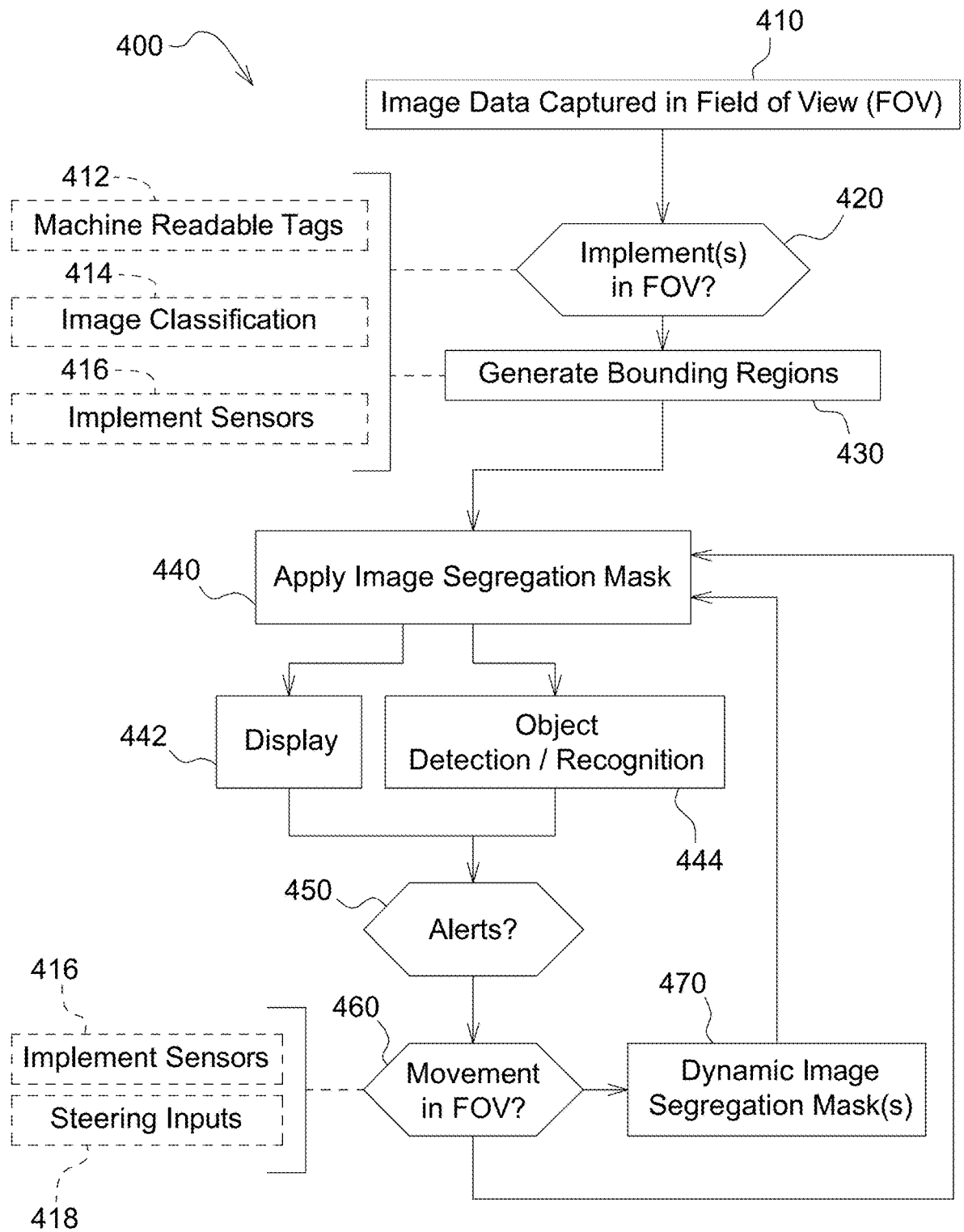
FIG. 7 is a flowchart representing an exemplary embodiment of a method as disclosed herein.

As represented in FIG. 4A, an object 310 (a human in the present example) is standing in the field of view 172 of a rear-mounted camera as sensor 170, behind the rear-mounted work implement 162. A bounding region 174 about the work implement 162 in the present example does not need to be highly precise, as further illustrated by reference to FIG. 4B. The corresponding image segmentation mask 176 may be applied to enable separation of the object 310 from the work implement 162 in a straightforward manner. As represented in FIG. 5A, however, the object 310 is still in the field of view 172 of the camera as sensor 170 but is now present between the work implement 162 and the main frame 140 of the work machine 100. If the image segmentation mask 176 were to be applied broadly with respect to a simple geometrically defined bounding region 174, appropriate separation of the object 310 may not be possible. Accordingly, a more precisely defined bounding region 174 and image segmentation mask 176 with respect to the contours of the respective work implement 162 may be preferable for at least this context, wherein an object 310 in close proximity to the work machine 100 may be reliably separated and identified by elements of the system.

In step 450, the system may be configured to generate any alerts that may be triggered by or otherwise appropriate in view of the object detection and/or recognition function. For example, if an object is recognized as being in a dangerous location relative to a position of the work implement, or otherwise in view of a predicted movement of the work machine and/or work implement, an alert may be generated in the form of an audio alarm, a visual alert on the display unit, or the like.

The type of alert may be dependent at least in part on the type of object, wherein for example a living creature as a first type of differentiated object in the field of view may result in a first and more urgent form of alert whereas a second type of differentiated object in the form of for example debris may result in a second and less urgent form of alert. In some embodiments this determination may be made in view of the above-referenced object detection and/or recognition function, further in view of a machine geometry or pose detection function which determines if the work implement 162 is in a position or orientation corresponding with for example a first work state (i.e., at rest and therefore of reduced risk to a proximate object) or a second work state (i.e., an active state and therefore of potentially heightened risk to a proximate object).

An alert according to step 450 may be generated visually for the benefit of the operator, and/or may include output signals generated to prevent actuation of the work implement 162 or other elements of the work machine 100 that could cause a collision or other intersection with a detected and/or recognized object.

Alert functions may be generated in certain embodiments in association with a predetermined threshold for a given work implement 162, a variable threshold depending on a work state or condition of the given work implement 162, and/or a non-threshold determination made further in view of factors including for example a detected movement of the object(s), detected movement of the work implement 162, predicted movements of the object(s) and/or work implement 162, type of terrain being traversed by the work machine 100, orientation of the work machine 100, and the like.

In some embodiments and further with reference to step 460, the system may be configured to determine whether the work implement 162 is moving or whether such movement is predicted in the field of view 172, and then accordingly to dynamically adjust application of the bounding region 174 and the corresponding at least one image segmentation mask 176 so that the masked region persists with an actual position of the work implement 162 in the field of view 172.

Movement of the work implement 162 may for example be determined and/or predicted using the above-referenced inputs (step 416) from implement-mounted sensors 164, and/or using inputs received (step 418) from the work machine steering control system 168. Regardless of whether the rear-mounted work implement 162 is a ripper assembly which substantially moves along with movement of the work machine frame 140, or a towed implement such as a tamping roller which is pivotally coupled about a vertical axis to the work machine frame 140, movement of the work implement may reliably be predicted based on knowledge of the type of attachment even if means are not available for directly sensing movement relative to the field of view 172.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of object detection for a work machine comprising a main frame, the method comprising:
   receiving, from at least one sensor associated with the work machine, data corresponding to a field of view extending from the main frame;
   classifying objects in respective locations in the field of view;
   generating at least one segmentation mask corresponding to contours for at least one attachment to the work machine as determined to be in the field of view, wherein each of the at least one segmentation mask defines a respective masked zone in the field of view, wherein the at least one attachment to the work machine is configured to move at least upward and downward relative to and independently of movements of the main frame, and wherein the at least one segmentation mask is dynamically generated based on determined upward and downward movements of the at least one attachment to the work machine relative to the field of view, wherein the movements are determined based at least in part via output signals from one or more movement sensors mounted with respect to the at least one attachment to the work machine; and
   determining one or more of the classified objects to be separate from the at least one attachment to the work machine, and detecting respective positions of the one or more further objects determined to be in the field of view, relative to the work machine and/or the at least one attachment to the work machine,
   wherein the at least one segmentation mask is applied to the at least one attachment to the work machine independently of any of the one or more separate objects in the field of view, and
   conditionally generating output signals to control at least one of the at least one attachment to the work machine based on at least an identified unsafe position of an object relative to at least one of the work machine and/or the at least one attachment to the work machine.

2. The method of claim 1, wherein the at least one sensor comprises an image sensor, the method further comprising generating images on a display unit corresponding to the field of view of the image sensor and having the at least one segmentation mask applied thereto.

3. The method of claim 2, wherein the at least one sensor comprises a plurality of image sensors, a first image sensor of the plurality of image sensors associated with the field of view extending from the main frame, and wherein the generated images on the display unit are augmented to generate images corresponding to one or more objects behind the at least one segmentation mask from a perspective of the first image sensor and within respective fields of view of one or more of the other image sensors.

4. The method of claim 1, comprising:
during movement of the work machine, detecting from the received data at least one static portion in the field of view and one or more dynamic portions relative thereto in the field of view; and
generating the at least one segmentation mask corresponding to the detected at least one static portion in the field of view.

5. The method of claim 1, wherein data corresponding to at least one attachment to the work machine is retrieved and applied for generation of an associated segmentation mask based on user input.

6. The method of claim 5, wherein the user input comprises a user selection from among a library of selectable portions of and/or attachments to the work machine.

7. The method of claim 1, wherein a bounding region for the at least one attachment to the work machine is determined via image classification from the received data.

8. The method of claim 1, wherein a bounding region for the at least one attachment to the work machine is determined by scanning a machine readable tag associated with the respective at least one attachment to the work machine and retrieving bounding region data corresponding to the respective at least one attachment to the work machine from data storage based on the scanned machine readable tag.

9. A work machine comprising:
a main frame supported by one or more ground engaging units;
at least one attachment to the work machine, each configured to move at least upward and downward relative to and independently of movements of the main frame;
at least one sensor configured to generate data corresponding to a field of view extending from the main frame; and
a controller linked to receive the data from the at least one sensor and configured to
classify objects in respective locations in the field of view,
generate at least one segmentation mask corresponding to contours for at least one attachment to the work machine as determined to be in the field of view, wherein each of the at least one segmentation mask defines a respective masked zone in the field of view,
wherein the at least one segmentation mask is dynamically generated based on determined upward and downward movements of the at least one attachment to the work machine relative to the field of view, wherein the movements are determined based at least in part via output signals from one or more movement sensors mounted with respect to the at least one respective attachment to the work machine,
determine one or more of the classified objects to be separate from the at least one attachment to the work machine, and detect respective positions of the one or more objects determined to be in the field of view, relative to the work machine and/or the at least one attachment to the work machine,
wherein the at least one segmentation mask is applied to the at least one attachment to the work machine independently of any of the one or more separate objects in the field of view, and
conditionally generate output signals to control at least one of the at least one attachment to the work machine based on at least an identified unsafe position of an object relative to at least one of the work machine and/or the at least one attachment to the work machine.

10. The work machine of claim 9, wherein the controller is configured to:
during movement of the work machine, detect from the received data at least one static portion in the field of view and one or more dynamic portions relative thereto in the field of view; and
generate the at least one segmentation mask corresponding to the detected at least one static portion in the field of view.

11. The work machine of claim 9, wherein data corresponding to at least one attachment to the work machine is retrieved from data storage and applied for generation of an associated segmentation mask based on user input via a user interface linked to the controller.

12. The work machine of claim 11, wherein the user input comprises a user selection from among a library of selectable portions of and/or attachments to the work machine.

13. The work machine of claim 9, wherein the controller is further configured to generate images for display on a display unit corresponding to the field of view and having the at least one segmentation mask applied thereto.

14. The work machine of claim 13, wherein the at least one sensor comprises a plurality of image sensors, a first image sensor of the plurality of image sensors associated with the field of view extending from the main frame, and wherein the generated images on the display unit are augmented to generate images corresponding to one or more objects behind the at least one segmentation mask from a perspective of the first image sensor and within respective fields of view of one or more of the other image sensors.

15. The work machine of claim 9, wherein a bounding region for the at least one attachment to the work machine is determined via image classification from the received data.

16. The work machine of claim 9, wherein a bounding region for the at least one attachment to the work machine is determined by scanning a machine readable tag associated with the respective at least one attachment to the work machine and retrieving bounding region data corresponding to the respective at least one attachment to the work machine from data storage based on the scanned machine readable tag.

* * * * *